United States Patent [19]
Goth

[11] Patent Number: 5,873,139
[45] Date of Patent: Feb. 23, 1999

[54] PIPELINE PIG SUPPLY SYSTEM

[75] Inventor: Gerhard Goth, Benningen, Germany

[73] Assignee: Filterwerk Mann & Hummel GmbH, Ludwigsburg, Germany

[21] Appl. No.: 908,036

[22] Filed: Aug. 11, 1997

[30] Foreign Application Priority Data

Aug. 10, 1996 [DE] Germany ................. 196 32 344.4

[51] Int. Cl.⁶ ............................................ B08B 9/04
[52] U.S. Cl. ........................................... 15/104.062
[58] Field of Search .................... 15/3.5, 3.51, 3.52, 15/104.061, 104.062, 104.063

[56] References Cited

U.S. PATENT DOCUMENTS

| | | | |
|---|---|---|---|
| 597,185 | 1/1898 | Huebner | 15/104.062 X |
| 2,713,909 | 7/1955 | Baker | 15/104.062 X |
| 3,678,730 | 7/1972 | Barrett, Jr. | 15/104.062 X |
| 4,113,890 | 9/1978 | Long | 15/3.5 X |
| 4,917,176 | 4/1990 | Shimada et al. | 15/104.062 X |
| 5,103,524 | 4/1992 | Vowles | 15/3.51 |

FOREIGN PATENT DOCUMENTS

| | | | |
|---|---|---|---|
| 193429 | 12/1907 | Germany | 15/3.5 |
| 474061 | 3/1929 | Germany | 15/3.5 |
| 8950 | of 1895 | United Kingdom | 15/104.062 |

*Primary Examiner*—Mark Spisich
*Attorney, Agent, or Firm*—Evenson, McKeown, Edwards & Lenahan, P.L.L.C.

[57] ABSTRACT

An apparatus for supplying scraper pigs, e.g., to material supply pipelines, which has within a housing at least one feeder or supply magazine which has at least two chambers, each chamber being able to hold one pig. The apparatus also has at least one drive which serves to drive the at least one feeder, and at least one pig inlet and at least one pig outlet.

10 Claims, 3 Drawing Sheets

PIPELINE PIG SUPPLY SYSTEM

BACKGROUND OF THE INVENTION

The present invention relates to an apparatus for supplying pipeline scrapers, commonly referred to as pigs, and to a material supply system incorporating such an apparatus.

A device of this type is disclosed, for example, in German Patent No. DE 4,210,659. If such devices are to be used, for example, in multiple station distribution systems, it is disadvantageous that these devices are not able to supply a large number of pigs within a short period of time.

SUMMARY OF THE INVENTION

It is thus the aim of the invention to provide an apparatus and material supply system of the above kind such that the variable use of pigs in conveyor systems can also be automated.

These and other aims of the invention have been achieved by providing an apparatus for supplying scraper pigs to a pipeline, the apparatus comprising a housing; at least one supply magazine arranged in the housing, the magazine having at least two supply chambers each communicating with a pig receiving inlet and a pig dispensing outlet and being able to receive one pig, and a drive operatively connected to the magazine to drive the magazine in order to move the supply chambers successively into communication with the pipeline which is to be supplied with pigs.

According to the invention, an apparatus is provided which comprises at least one feeder or magazine which is arranged in a housing and has at least two supply chambers, each of which has a pig receiving inlet and a pig dispensing outlet and can receive a pig, the apparatus further comprising at least one driver which serves to drive the at least one feeder. This makes it possible to make several pigs available, which can be fed through the at least one pig dispensing outlet into a material conveyor pipeline to clean the conveyor pipeline.

In one advantageous embodiment of the invention, the apparatus is provided with an additional feeder device. By means of the additional feeder, either the number of pigs in the supply can be increased, or else the first feeder can be supplied automatically. Such automatic supply can be accomplished, for example, by providing a hopper, similar to an automatic cigarette dispenser, which contains pigs which are delivered into the first feeder by means of a pusher.

Another advantageous embodiment of the invention provides for the feeder to be a disk provided with at least two through-bores. This embodiment has the advantage that the construction of this so-called drum magazine is very compact, while at the same time it has desirable rotational properties which are manifested in the way the pigs are made available.

In a further advantageous embodiment of the invention, the bores are accessible for loading from one side. This permits both automatic as well as the manual loading of the feeder or magazine with pigs.

Another advantageous embodiment of the invention provides for the apparatus to have a pipe closure element in the area of the pig outlet. In such material conveyor systems, material often is moved by pressure gradients. In order to build up a vacuum, for example, as a source of motive power for a pig which is to be passed through the pipeline, whereby the external configuration of the pig may be unimportant, it is necessary to close the conveyor pipe in order facilitate the vacuum build-up to provide the necessary motive power for the pig when the closure element is abruptly opened again.

A still further advantageous embodiment of the invention provides for the pipe closure element to completely seal off the end of the pipe. This has the advantage, especially in the case of pigs with somewhat more air-permeable geometries, for example pigs which are similar to a brush, that the necessary transport vacuum develops independently of the pig geometry.

Another advantageous embodiment of the invention provides for the apparatus to include at least one pig detection means. This detector determines whether the feeder or magazine still has a sufficient number of pigs, or whether the feeder is in need of more pigs. The indication of the extent to which the feeder is filled can be obtained through a control box which, for example, emits a signal which starts a feeder filling procedure. An alternative would be to have a simple light signal or sound signal indicating that the feeder needs to be filled by hand.

An advantageous embodiment of the invention envisions that the drive means is remotely controllable. This makes it possible to operate the apparatus in an automated manner, so that pigs can be introduced into the material conveyor system as they are needed.

Another advantageous embodiment of the invention provides for the pipe closure element to be remotely controllable. With such an arrangement, the point in time when a pig is to execute the pipe cleaning can be precisely predetermined through an intentionally controlled actuation of the pipe closure element. Without the pipe shutter, the vacuum necessary for transport would be either rather irregular or there would be none at all if the pig geometry were such that the gap between the pig and the pipe was rather large. By allowing a vacuum to build up and then opening the pipe closure element in an abrupt or impulse-like manner at a predetermined point in time, the desired result, namely a defined cleaning of the pipes, is achieved.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments depicted in the accompanying drawings, in which.

DETAILED DESCRIPTION OF PREFERRED EMBODIMENTS

Figure 1:
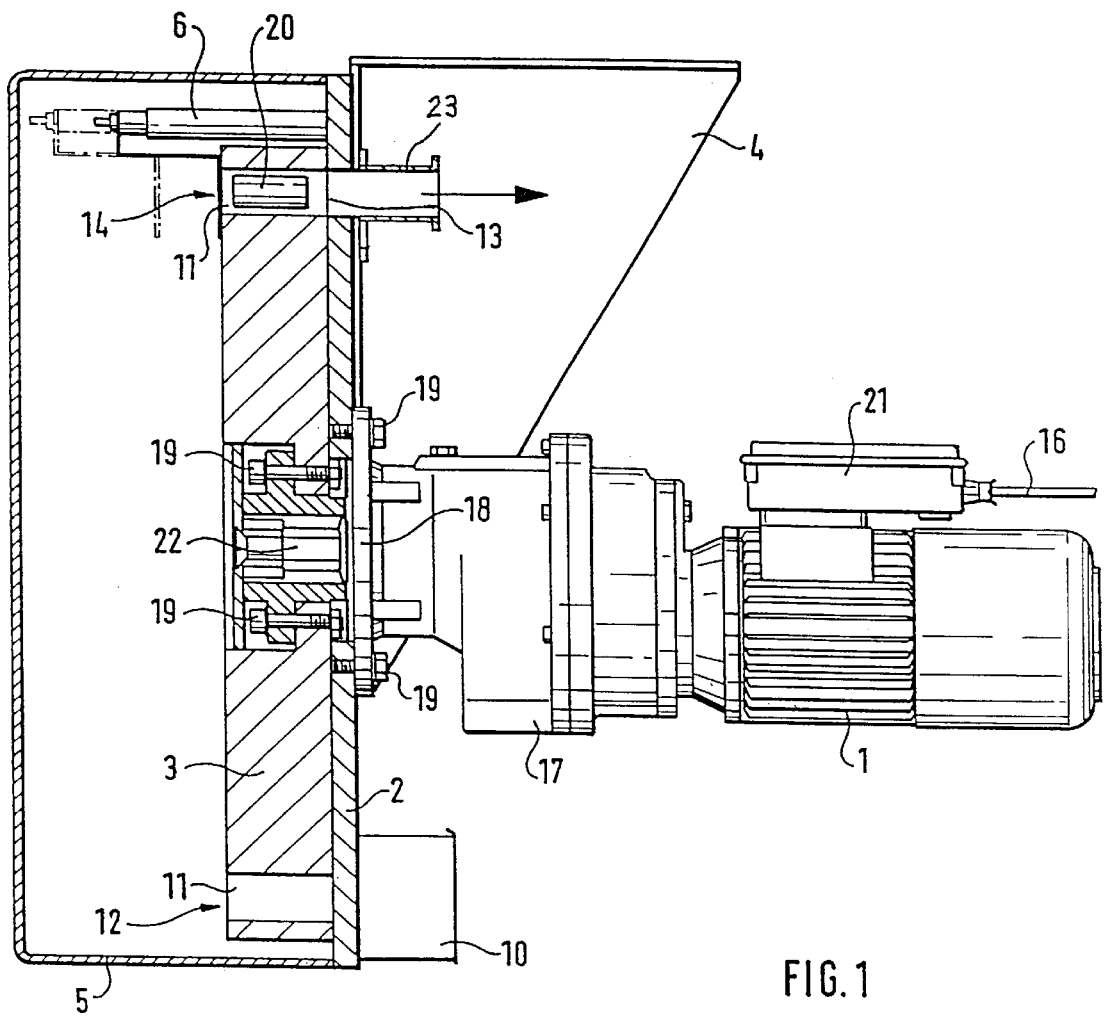
FIG. 1 is a sectional view through a preferred embodiment of the invention.

The pig supplying apparatus of the invention as shown in FIG. 1, comprises a gear motor 1 with transmission 17, the transmission 17 being secured to a base plate 2 by means of drive mounting flange 18 and screws 19. The magazine 3, which in this embodiment is configured as a revolving plate or disk with through-bores 11, is connected through the transmission 17 and the drive shaft 22 to the gear motor 1 so that the magazine disk 3 can be rotationally driven by the gear motor. The wall-mounting bracket 4, which is fastened by screws 19 to the base plate 2, bears the entire apparatus and can be fastened to any wall, not shown.

A cover 5 forms the housing of the apparatus in conjunction with the base plate 2. If the machine is to be refilled with pigs 20 by hand, cover 5 should be easily removable or have openings which permit easy access to the magazine 3, particularly to the through-bores or supply chambers 11.

The magazine 3 has pig inlets 12 and pig outlets 13 which communicate with magazine chambers 11. The apparatus also has a pipe closure element 14 which is mounted on the base plate 2. This pipe closure element 14 is urged by a driver 6, which may comprise a pneumatic cylinder, against the end of the pipe whenever it is necessary to build up a vacuum in order to provide the motive power necessary for transporting a pig 20 through the conveyor pipeline 23. A controller box or switchbox 10 is mounted on the base plate 2.

Figure 2:
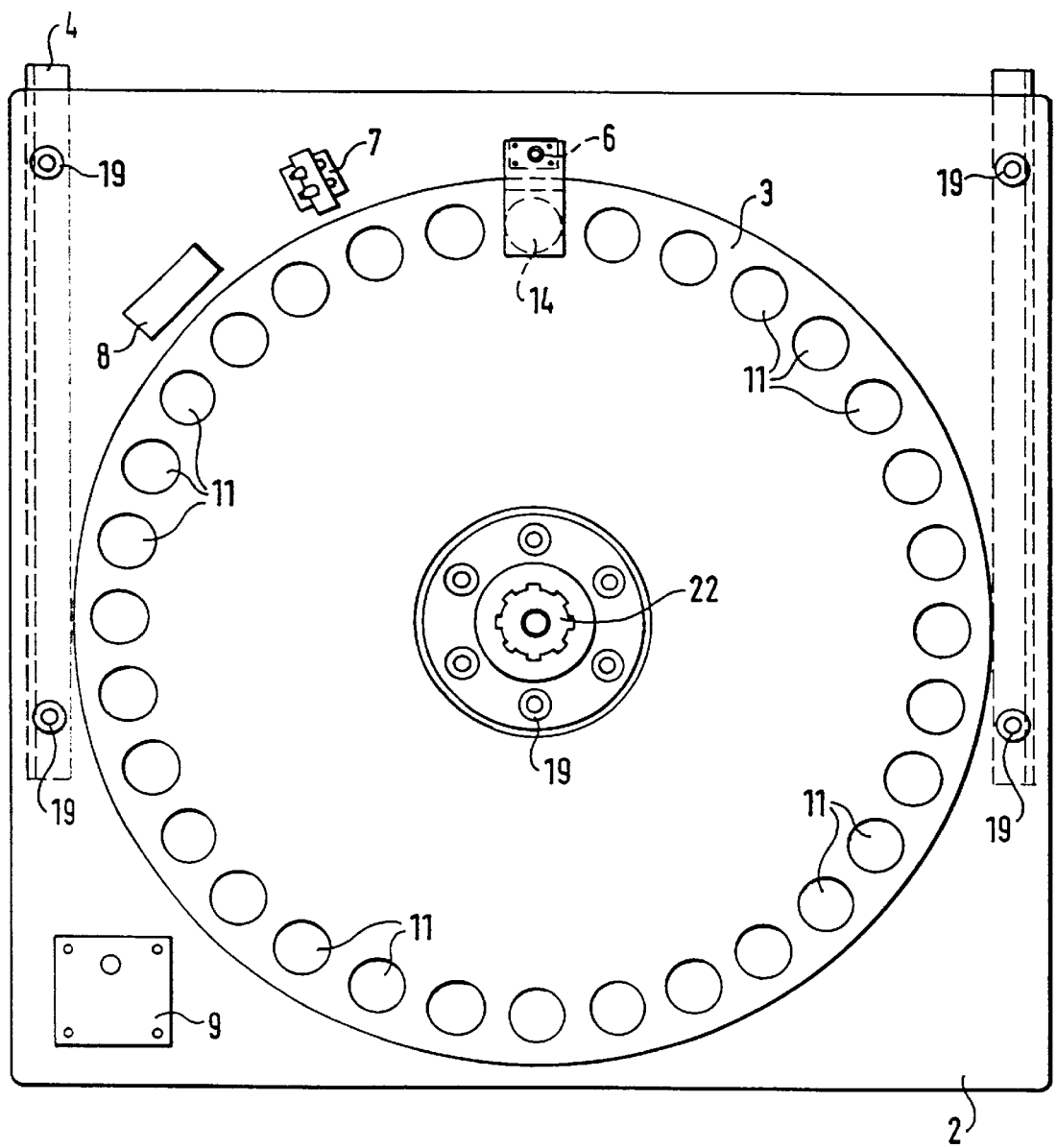
FIG. 2 is a front elevation of the apparatus of FIG. 1 minus its drive and gear motor.

Also on the base plate 2, as seen in FIG. 2, is an IAS sensor 7 which gives a signal via the switchbox 10 to the gear motor 1 to stop the gear motor after advancing one chamber 11.

On the base plate 2, a so-called pig detector 8 is installed which produces a signal whenever the supply of pigs is exhausted. Alternatively the signal can be produced whenever the supply of pigs falls below a predetermined minimum number. In the present embodiment this signifies that, when a positive signal is given, at least three pigs remain available. By means of the sensor 9 the magazine 3 can be advanced by the gear motor 1 in manual or stepped operation. The gear motor 1 is connected by control cable 16 to the switchbox 10, which makes it possible to advance the magazine and operate the pig supply apparatus automatically in conjunction with an overall factory control system. The apparatus of the invention is particularly suitable for use with a pipeline conveyor system for feeding plastic pellets to molding machines or the like. The apparatus has a pipe closure element 14 which is mounted on the base plate. This pipe closure element 14 is urged by the actuator 6 against the end of the pipe, which in this embodiment is identical with the pig receiving inlet, whenever a vacuum necessary for the transport of a pig is to be built up in the pipe 23. The transmission flange 18 is attached to the base plate 2 by screws 19. The base plate 2 is in turn attached by screws to a wall mounting bracket 4, which in turn is fastened to a wall, not shown.

The pig supply apparatus of the invention can be connected to a plurality of pipelines 23 at different points around the periphery of the magazine 3 and, if desired, can also be provided with a plurality of pipe closure elements 14, each associated with a respective one of the different pipelines 23. By appropriately connecting the plural pipe closure elements 14 to a common control system, such as switchbox 10, pigs 20 can be supplied automatically from a single supply apparatus simultaneously or in any desired succession to several different pipelines, for example to the plastic pellet supply pipelines of several different plastic molding machines in a factory.

Figure 3:
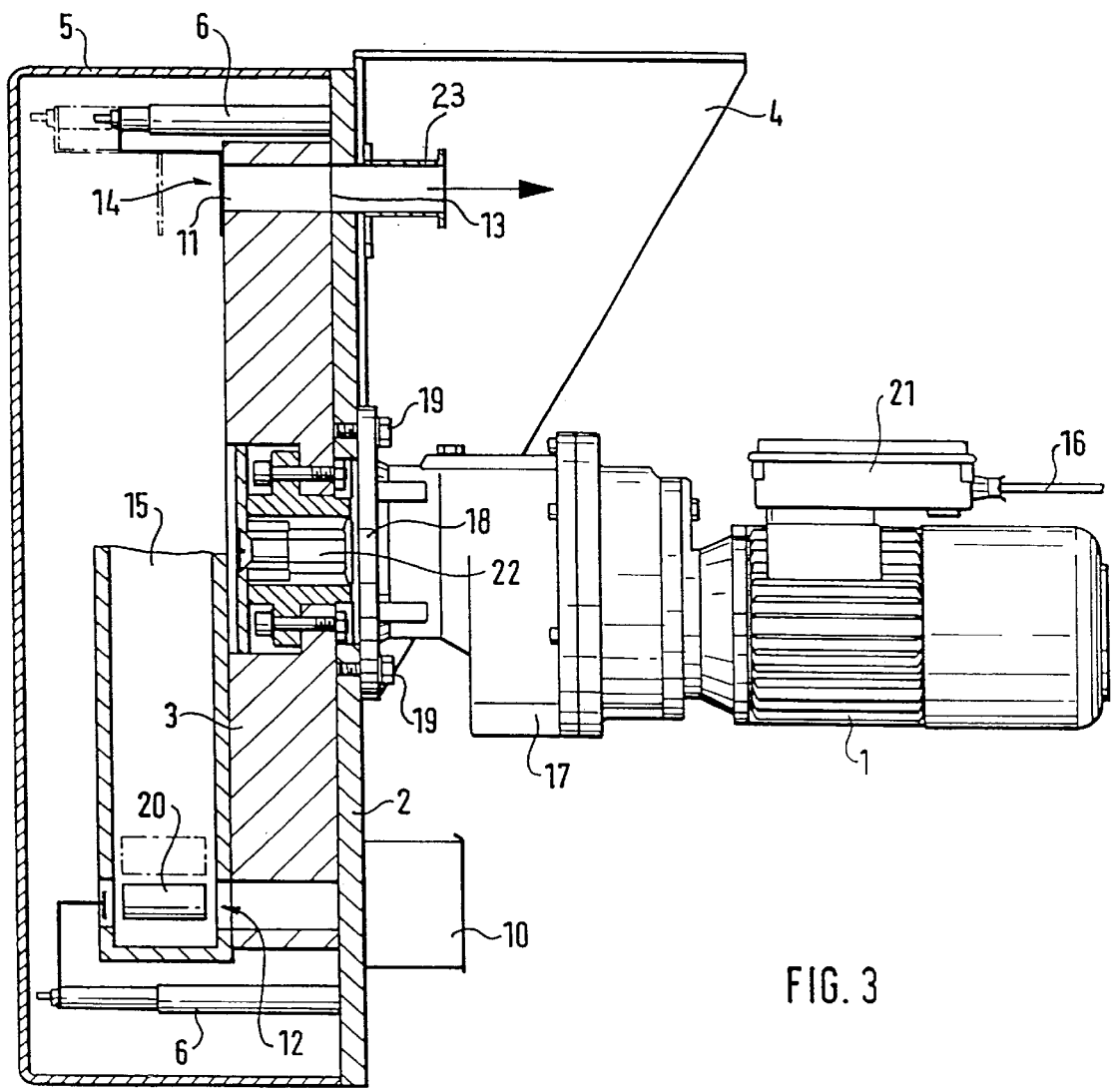
FIG. 3 is a sectional view through an alternative embodiment.

In an alternative embodiment, which is shown in FIG. 3, at least one pig supply hopper 15 communicates with magazine 3, in particular with the pig loading inlet 12, such that by means of the hopper 15 the number of pigs 20 available can be increased. By means of an additional actuator 6 in conjunction with an control signal transmitted to the actuator 6 via the control box or switchbox 10 and a connecting cable, not shown, the magazine 3 can be filled automatically from the pig supply hopper 15 as the additional actuator 6 feeds the pig 20 in front of it from the pig hopper 15 into a chamber 11 in the magazine 3. Similar to the arrangement shown in FIG. 1, the apparatus of FIG. 3 likewise comprises a gear motor 1 with a transmission 17, the transmission 17 being mounted on the base plate 2 by a flange 18 and screws 19. The magazine 3, which in this embodiment is in the form of a bored plate 3, is connected through the transmission 17 to the gear motor 1 so that the motor 1 can rotate the plate 3. The gear motor 1 is connected to the control box or switchbox 10 by control cable 16, which in turn communicates with the electrical transmission junction box situated on the gear motor, through which automatic operation is possible in connection with a factory control system, not illustrated in this Figure, which may, for example, be a plastic material supply control conveyor system. The wall-mounting bracket 4 which is fastened by screws 19 to the base plate 2, bears the entire apparatus and is fastened to any desired wall, not shown. In conjunction with the base plate 2, the cover 5 forms the housing of the apparatus. The magazine 3 has pig inlets 12 and pig outlets 13 which communicate with supply chambers 11. The apparatus has a pipe closure element 14 mounted on the base plate 2. This pipe closure element 14 is urged by the actuator means 6 against the end of the pipe whenever a vacuum needed for the transport of a pig 20 is to be created in the pipe 23.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for supplying scraper pigs to a pipeline, said apparatus comprising a housing; at least one supply magazine arranged in the housing, said magazine having at least two supply chambers each communicating with a pig receiving inlet and a pig dispensing outlet and being able to receive one pig, a drive operatively connected to the magazine to drive the magazine in order to move the supply chambers successively into communication with the pipeline to be supplied with pigs, a supply hopper for pigs and a pusher mechanism for loading pigs from said hopper into supply chambers of the magazine.

2. An apparatus according to claim 1, wherein said supply magazine comprises a disk having at least two through-holes formed therethrough.

3. An apparatus according to claim 2, wherein the through-holes are accessible from one side for loading.

4. An apparatus according to claim 1, further comprising at least one pig detection element.

5. An apparatus according to claim 1, further comprising a drive control element for selectively activating said drive.

6. An apparatus according to claim 1, wherein said magazine comprises a revolving disk rotated by said drive and said supply chambers comprise through-bores extending parallel to the axis of the disk.

7. An apparatus for supplying scraper pigs to a pipeline, said apparatus comprising a housing; at least one supply magazine arranged in the housing, said magazine having at least two supply chambers each communicating with a pig receiving inlet and a pig dispensing outlet and being able to receive one pig, a drive operatively connected to the magazine to drive the magazine in order to move the supply chambers successively into communication with the pipeline to be supplied with pigs, and a pipe closing element adjacent the pig dispensing outlet.

8. An apparatus according to claim 7, wherein the pipe closing element is displaceable to fully close off the magazine supply chamber adjacent the pig dispensing outlet.

9. An apparatus according to claim 7, a controller for selectively actuating the pipe closing element.

10. An apparatus according to claim 9, wherein said controller comprises a pneumatic cylinder.

* * * * *